(12) United States Patent
Janeke

(10) Patent No.: US 9,193,457 B2
(45) Date of Patent: Nov. 24, 2015

(54) SUPERCONDUCTIVE HYPERSONIC LIQUEFACTION NOSECONE

(71) Applicant: Charl Emelio Janeke, Agoura Hills, CA (US)

(72) Inventor: Charl Emelio Janeke, Agoura Hills, CA (US)

(*) Notice: Subject to any disclaimer, the term of this patent is extended or adjusted under 35 U.S.C. 154(b) by 222 days.

(21) Appl. No.: 13/969,467

(22) Filed: Aug. 16, 2013

(65) Prior Publication Data

US 2015/0048208 A1    Feb. 19, 2015

(51) Int. Cl.
*B64C 30/00* (2006.01)
*B64C 1/00* (2006.01)
*B64C 1/38* (2006.01)

(52) U.S. Cl.
CPC .............. *B64C 30/00* (2013.01); *B64C 1/0009* (2013.01); *B64C 1/38* (2013.01)

(58) Field of Classification Search
CPC .. B64C 30/00; B64D 33/02; B64D 2033/024; B64G 1/50; B64G 1/58; B64G 1/62; F17C 2227/0311; F17C 2227/0303; F17C 2227/0383; F17C 2270/0186; F17C 2270/0189
USPC ........................................................ 62/53.2
See application file for complete search history.

(56) References Cited

U.S. PATENT DOCUMENTS

| | | | | |
|---|---|---|---|---|
| 3,062,148 A * | 11/1962 | Le Bel | ..................... | 244/159.3 |
| 3,080,816 A * | 3/1963 | Levine | .................... | 250/238 |
| 3,128,964 A * | 4/1964 | Le Bel | ..................... | 244/159.1 |
| 3,211,215 A * | 10/1965 | Walker | ............... | 165/46 |
| 3,259,065 A * | 7/1966 | Ross et al. | .................... | 244/3.1 |
| 3,283,572 A * | 11/1966 | Wormser | .................... | 73/178 R |
| 3,424,400 A * | 1/1969 | Le Bel | ..................... | 244/1 N |
| 3,625,056 A * | 12/1971 | Wortman | ..................... | 374/35 |
| 3,708,139 A * | 1/1973 | Wheeler | ..................... | 244/3.13 |
| 4,381,333 A * | 4/1983 | Beggs et al. | .............. | 428/312.6 |
| 4,923,146 A * | 5/1990 | Anthony | .................. | 244/117 A |
| 5,191,761 A | 3/1993 | Janeke | | |
| 5,291,830 A * | 3/1994 | Zwan | ........................ | 102/293 |
| 5,299,762 A * | 4/1994 | Kosson et al. | ............ | 244/117 A |
| 5,687,932 A * | 11/1997 | Gomes | ....................... | 244/171.8 |
| 5,853,143 A * | 12/1998 | Bradley et al. | .............. | 244/3.21 |
| 6,213,431 B1 | 4/2001 | Janeke | | |
| 6,830,221 B1 * | 12/2004 | Janson et al. | ............ | 244/158.1 |
| 7,051,659 B2 * | 5/2006 | Tyll et al. | ..................... | 102/374 |
| 7,344,111 B2 * | 3/2008 | Janeke | ....................... | 244/158.9 |
| 8,765,230 B1 * | 7/2014 | Waldrop et al. | ............. | 427/402 |
| 2001/0051218 A1 * | 12/2001 | Wittenauer et al. | ........ | 427/376.2 |
| 2014/0190666 A1 * | 7/2014 | Schlie et al. | ............ | 165/104.21 |

* cited by examiner

*Primary Examiner* — Tien Dinh
*Assistant Examiner* — Christopher Hutchens
(74) *Attorney, Agent, or Firm* — J. Curtis Edmondson; Law Offices of J. Curtis Edmondson

(57) ABSTRACT

An apparatus and method for mitigating the shock front of an aerospace plane flying at hypersonic speeds. The invention employs supercooling driven by the cryogenic power of liquid hydrogen, regenerative evaporation of liquid hydrogen or liquid nitrogen and consequential isothermal compression, to usurp the shock front in totality at Mach 1.

7 Claims, 3 Drawing Sheets

SUPERCONDUCTIVE HYPERSONIC LIQUEFACTION NOSECONE

CROSS REFERENCE TO RELATED APPLICATIONS

The present application claims the benefit of U.S. Provisional Patent Application No. 61/683,836, filed on Aug. 16, 2012 and entitled "Superconductive Hypersonic Liquefaction Nosecone," which is herein incorporated by reference in its entirety.

GOVERNMENT FUNDING

No government funding was utilized for this invention.

BACKGROUND

This invention relates to the nosecone design of a rocket or aerospace plane. More specifically, this invention relates to the mitigation of the shock front experienced at hypersonic speed through supercooling.

U.S. Pat. No. 5,191,761, owned by the applicant for the present invention, discloses an air breathing aerospace engine. That patent is incorporated by reference in its entirety. The engine includes a frontal core that houses an oxygen liquefaction system that captures ambient air, liquefies and separates the oxygen. The oxygen may then be used in the rocket engine.

U.S. Pat. No. 6,213,431, owned by the applicant of the present invention, discloses an aerospike engine. That patent is incorporated by reference in its entirety. An aerospike engine may have a tapered body with a slanted or curved reaction plane. A fuel injector directs fuel down the reaction plane. The combustion of the fuel on the reaction plane creates a propulsive force across the reaction plane.

U.S. Pat. No. 7,344,111 hence discloses a re-usable or reversible SSTO that may be expediently launched to service the rapidly expanding space enterprise. Merging patent '761 and patent '431 rendered a unique aerospace plane confirmation (the '111 patent) with a liquefaction or supercooling nosecone on the ascending or leading direction and an adaptive aerospike rocket engine on the tail end.

Oxygen constitutes 89% of the mass of the necessary propellant for such an engine. A substantial portion of the necessary liquid oxygen can be distilled out of the ambient atmosphere at hypersonic speeds by supercooling through turbo compression at the nosecone. Through this process, the merged aerospace plane would be capable of tanking the necessary hydrogen as well as carrying a substantially improved payload into orbit. However, a consequence of tanking all of the necessary liquid hydrogen propellant onboard would be to invariably result in bubbly contours.

A reversible ("Uturn") aerospace plane was rendered that can fly hypersonically without the impediment of shock waves, shock front, or superheated intake air (a node of optimality) in the ascending direction whilst reentering in the reversed (high drag) direction into the atmosphere with the benefit of cushioned heat dissipation in the higher/rarified atmospheric domain. The slated "turbocharged" aerospace plane may also be barrel-rolled through the initial reentry phase so as to dissipate the insipient heat into deep space. As a consequence of employing the cryogenic potential of the liquid oxygen/hydrogen propellants to supercool the nosecone in lieu of cooling the jacket of the rocket engine, it would be conversely be necessary to line the expansion ramp of the aerospike engine with ceramic tiles. Slated ceramic tiled would function both as a reentry shield as well as active ramp insulation. The Uturn would hence facilitate an aerospace plane with substantially lesser heat shield whilst limiting ceramic tiles to the aero spike engine expansion ramps.

Whereas the efficacy of the oxygen liquefaction would be substantially constrained by the extremely low pressure of the rarified atmospheric air at high altitudes with the "111" patent in its native form, the addition of a turbo compressor driven by either superheated nitrogen or superheated hydrogen in accordance with claims #1 and #13 of the "111" patent would substantially expand the operating envelope of the air breathing aerospace engine. The high compressed ambient air may hence be inter-cooled in accordance with the means provided via patent "111" and hence expanded/flashed into the cryogenic zone via an expansion motor/turbine that may either augment the compression process or drive the propellant pumps. Means of supercooling the nose cone at supersonic speeds is additionally being introduced to suppress the formation of the shock front in the abstract (eg $\lim dQ \gg \infty$, $dL=0$), "freezing" OR usurping the incipient shock at Mach 1 and rendering isothermal compression in lieu of adiabatic compression of the intake air into the liquefaction plant throughout the hypersonic regime.

A novel new approach with a rocket or aerospace plane flying hypersonically through the atmosphere entails morphing (cool) isothermal compression (in lieu of a blazing shock front) by orchestrating supercooling and superconductivity in coherence, usurping the insipient shock wave at formation (Prandtl singularity, Mach1) and distilling both liquid oxygen as well as liquid nitrogen simultaneously out of the incident atmospheric air via regenerative chilling. The rational simply entails that in lieu of dissipating 99.99% of the incident kinetic energy in the shock front at hypersonic velocity (an irreversible adiabatic process), 99.99% of the kinetic energy is conversely converted into useful work via isothermal compression of the incident atmospheric air. By employing the cryogenic power of tanked hydrogen incident to a H2/O2 propulsive system coherently and morphing isothermal compression by means of the Prandtl singularity "niche" via the force of supercooling AND superconductivity, compressed supercool/saturated/liquefacted ambient air may be rendered as a unique solution to a perplexing technological challenge.

The following definitions apply to terms used in this application:

Liquefaction: The condensation of a gaseous medium.

Supercooling: Rate of cooling orders of magnitude in excess of normal heat transfer rates.

Superconduction: Rate of conduction orders of magnitude in excess of normal conduction rates.

Superemissivity/absorptivity: Emissivity or absorptivity in excess of unity by means of negative refraction (or contact area morphing).

Supersonic: Flying 2-3 times the speed of sound.

Hypersonic: Flying 4-20 times the speed of sound.

Isothermal compression: Compression at constant temperature

Adiabatic compression: Compression without loss of heat (eg rapid compression via a shock wave).

Normally compression of air results in an increase in the temperature of the incident air. Air may be compressed either via a mechanical device (reciprocating or turbo compressor) OR via the ram force of a body traveling though the atmosphere. Compression of the air may be enhanced via a diffuser in the latter instance. At high speeds rapid compression of the air results in formation of a shock wave (adiabatic/trapped heat of compression). The speed of the body traveling through the atmosphere at formation of a shock wave is denoted Mach1. The energy content of the air at Mach1 is labeled "total" or "stagnation" temperature "Ts" in absolute terms. The pertinent relationships are as follows:

$$Ts=To[1+(k-1)/2\times M^2] \quad (1)$$

where Ts is the stagnation temperature, To=ambient temperature in absolute terms, k=polytropic constant Cp/Cv=1.4 and M=Mach number;

$$T2/T1=(p2/p1)\hat{\ }k-1/k \quad (2)$$

Where T2/T1 is the adiabatic temperature ratio and p2/p1 is the compression ratio;

$$wa=Cp\cdot R\cdot T1\cdot(k/k-1)[(p2/p1)\hat{\ }k-1/k-1] \quad (3)$$

where wa is the adiabatic work of compression, R is the ideal gas constant, T entering temperature;

$$wi=Cp\cdot R\cdot T1\cdot \ln(p2/p1) \quad (4)$$

where wi is the isothermal work of compression with a compression ratio of p2/p1 vis-à-vis; Atmospheric pressure model (http://en.wikipedia.org/wiki/Atmospheric_pressure);

| | |
|---|---|
| 1 | 0 |
| 1/2 | 18,000 ft |
| 1/3 | 27,480 ft |
| 1/10 | 52,926 ft |
| 1/100 | 101,381 ft |
| 1/1,000 | 159,013 ft |
| 1/10,000 | 227,899 ft |
| 1/100,000 | 283,076 ft. |

0/E^3=20; 50,000 ft/E^6=403; 95,000 ft/E^9=8,103; 150,000 ft/E^12=162,755

The real time Mach number/stagnation temperature relationship in terms of altitude has been determined as follows (http://www.grc.nasa.gov/WWW/BGH/stagtmp.html);

| | |
|---|---|
| M1 = 500 R | @5000 ft |
| M2 = 700 R | @30-90,000 ft |
| M3 = 1100 R | @40-90,000 ft |
| M4 = 1600 R | @40-90,000 ft |
| M5 = 2200 R | @40-100,000 ft |
| M6 = 3200 R | @40-100,000 ft |
| M7 = 4200 R | @40-100,000 ft |
| M8 = 5300 R | @40-100,000 ft. |

The respective shock/gradient for a (real time) adiabatic shock front (plus associated frontal pressure) may hence be rendered via the polytropic relationship p2/p1=[T2/T1]^k/(k−1) as follows;

| | | |
|---|---|---|
| M1: p2/p1 = 2.2 | p2 = paxp2/p1 = 2 × 15/2.75 = 11 psi | @20,000 ft |
| M2: p2/p1 = 3.2 | p2 = paxp2/p1 = 3.2 × 15/4 = 12 psi | @30,000 ft |
| M3: p2/p1 = 16 | | |
| M4: p2/p1 = 59 | | |
| M5: p2/p1 = 179 | p2 = paxp2/p1 = 179 × 15/55 = 49 psi | @70,000 ft |
| M6: p2/p1 = 663 | | |
| M7: p2/p1 = 1718 | | |
| M8: p2/p1 = 3878 | ×15/1100 = 53 psi | @100,000 ft |

In event of isothermal compression the Bernoulli's law will control with p=V^2/2vg/144 in psi. The respective frontal pressure in event of isothermal compression hence becomes:

| | |
|---|---|
| M1: p1 = | |
| M2: p2 = 10.3 psi | @27,480 ft (1/2) |
| M3: p3 = | |
| M4: p4 = 3.9 psi | @52,926 ft (1/3) |
| M5: p5 = | |
| M6: p6 = 2.8 psi | @101,381 ft (1/100) |
| M7: p7 = | |
| M8: p8 = 2.0 psi | @120,000 ft (1/245) |
| M9: p9 = | |
| M10: p10 = 0.77 psi | @159,013 ft (1/1000) |

The work of compression for a (normalized) free-range adiabatic compression hypersonic shock ram versus isothermal compression (in the abstract) at Mach8 is as follows:

$$wa=Cp\cdot R\cdot T1\cdot(k/k-1)[(p2/p1)\hat{\ }k-1/k-1]=0.25\times 3.5\times 53.3\times 400/788\times[(3878)\hat{\ }0.286-1]=226 \text{ Btu/lb}$$

$$wi=Cp\cdot R\cdot T1\cdot \ln(p2/p1)=0.25\times 53.3\times 400/788\times \ln(245)=37 \text{ Btu/lb.}$$

The impact of a sustainable isothermal (ram) compression system thru the hypersonic domain is threefold, eg 1) that the destructive thermal impact in the native/adiabatic mode is being contained 2) the work of compression is substantially mitigated to the extent that the latent heat of evaporation of hydrogen component alone of the LH2/LO2 propellant will suffice in dissipating the incident heat of compression within the realm of the supercool synthesis and 3) the drag force of a "superconductive hypersonic liquefaction nosecone" will be proximal 6× (eg 226/37) less in comparison to a native hypersonic aerospace plane flying trough the hypersonic zone.

The mass flow rate at Mach8 (8,000 ft/sec) conversely=8,000×1/14/245=2.33/lb/SF/sec. The heat of compression hence becomes:

Qa=226×2.33×3600=1,895,688 Btu/SF/h
Qi=37×2.33×3600=310,356 Btu/SF/h.
O2: Latent Heat of Vaporization: 2934 BTU/lb mole (92 Btu/lb)
http://www-safety.deas.harvard.edu/services/oxygen.html#physical
N2: Latent Heat of Vaporization: 2399 BTU/lb mole (86 Btu/lb)
http://www-safety.deas.harvard.edu/services/nitrogen.html#physical
H2: Latent Heat of Vaporization: 389 Btu/lb-Mole (195 Btu/lb)
http://www.ehs.ufl.edu/Lab/Cryogens/hydrogen.html
H2 has two different nuclear spin states: ortho-hydrogen (spin 1 state) and para-hydrogen (spin 0 state). Near room temperature, equilibrium hydrogen is 75% ortho and 25% para. However, at low temperatures, around the normal boiling point of 20.3 K, hydrogen is nearly all in the para-hydrogen state. The conversion process from ortho to para hydrogen is exothermic and generates about 700 KJoule/mole.

BRIEF SUMMARY OF THE INVENTION

The invention comprises means to supercool the incipient shock wave, generated at Mach 1, of a rocket or (aero) space plane. Supercooling (or superchilling) will result in usurpation of the shock wave by dissipating the heat of compression at the same rate of formation. By dissipating the heat of compression at an infinite rate throughout the supersonic and hypersonic regime, the shock front and associated heat would be totally abated. During dissipation of the shock front, the ambient air at inception will be isothermally compressed throughout the supersonic and hypersonic regimes. Cool isothermal compression (as opposed to hot adiabatic compression) is an essential prerequisite for efficient liquefaction of ambient air. Liquid hydrogen may be employed to chill the nosecone of a rocket or space plane to mitigate the shock front at hypersonic speed. Supercooling, on the other hand, through a combination of superconductivity and superemissivity, may usurp the shock front in its totality at Mach 1. The supercooling is driven by the cryogenic power of liquid hydrogen, regenerative flash evaporation of liquid hydrogen and/or liquid nitrogen, and consequential isothermal compression. The resulting supercooled air may be compressed, regeneratively intercooled, and flashed into liquid air. Under conditions of optimality the incipient air stream may be compressed in accord with the stagnation pressure of the Mach number and liquefacted in one-step via the power of supercooling and isothermal compression.

In order to achieve supercooling, a superconductive heat exchanger medium will be required. Although copper becomes a superconductive at the flashing temperature of liquid hydrogen, copper in isolation is not a suitable material for a superconductive heat exchanger driven by liquid hydrogen. Liquid hydrogen would also be a hazardous supercooling medium, as leakage would result in destruction. This invention provides for a novel approach employing liquid nitrogen (an inert medium) and a double-shelled, glass dome with superemissive coatings on the inside and outside to facilitate supercooling through superemissive/superabsorptive coatings. Superconductivity will hence be morphed through (1) $4^{th}$ power driving force of the Boltzman equation system and (2) close coupling of the radiative surfaces. The glass surfaces may simply be etched or coated with special means (for example diamond power) so as to facilitate the desired emissivity/conductivity.

In one aspect the invention relates to a rocket or aerospace plane flying hypersonically through the atmosphere with means to mitigate/eliminate the shock front at hypersonic speed via the cryogenic power of liquid hydrogen. In another aspect the invention relates to a method of distilling oxygen out of atmospheric air by means of the cooling capacity of liquid/slush hydrogen. In a third aspect of the invention, the Prandtl singularity is introduced as the route into the abstract (for example changing lanes) to mitigate/eliminate the shock front at hypersonic speed. A fourth component of the invention is morphing superconductivity as superemissivity through a concentric, close-coupled (double-decker) black bulb radiation system driven by liquefacted nitrogen. A fifth aspect of the invention constitutes morphing of superemissivity by superemissive form factor through "scatter" emissivity.

A sixth aspect of the invention introduces liquid hydrogen as the principle cryogenic potential force. A seventh aspect of the invention comprises the power of supercooling and superconductivity in sink as means to open the door of the Prandtl singularity. An eighth aspect of the invention comprises the cooling/chilling force of the liquefacted oxygen and liquefacted nitrogen. A ninth aspect of the invention comprises maximizing the suprecooling and liquefaction potential of both the liquefacted oxygen and liquefacted nitrogen through regenerative cooling.

Whereas liquid hydrogen on its own merits may be rationally applied to mitigate the shock front at hypersonic speed and distilled liquid oxygen in a one-step process, the efficacy is limited to a narrow band of the hypersonic domain. However, lining up the powers of supercooling, superconductivity, super emissivity and regenerative cooling opens the door to the abstract: a rocket or aerospace plane flying hypersonically through the atmosphere without impediment through the use of a superconductive hypersonic liquefaction nosecone.

DETAILED DESCRIPTION OF THE INVENTION

A rocket or aerospace plane in accordance with one or more embodiments of the invention construes an aerospace plane flying hypersonically through the atmosphere with means to mitigate/eliminate the shock front at hypersonic speed via the cryogenic power of liquid hydrogen or liquid methane via the (Prandtl singularity) at Mach 1. Liquefacted oxygen may hence be harvested as a consequence of rational alignment of the supercooling potential of (tanked) liquid hydrogen and regenerative power of liquefacted oxygen and liquefacted nitrogen. As an extension of the premise of liquefaction/regeneration, liquefacted nitrogen may be applied in substitution of (tanked) hydrogen and/or liquid methane as the supercooling denominator in cohesion with structured superemissivity.

Figure 1:
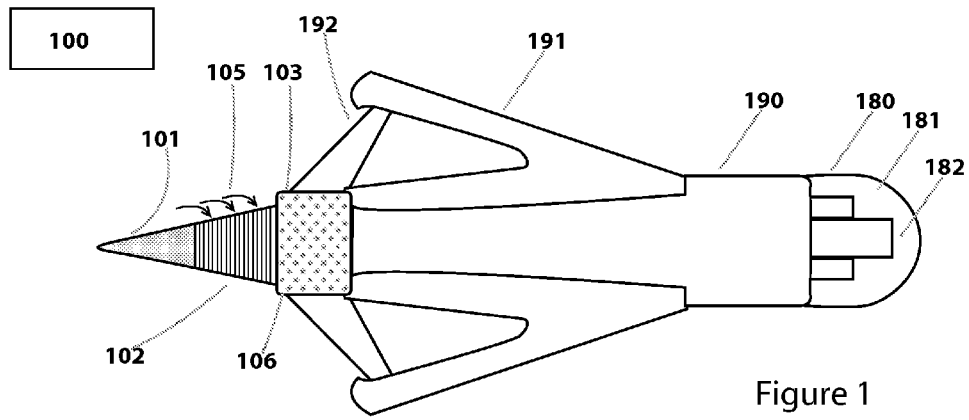
FIG. 1 illustrates an aerospace plane with an aero spike rocket engine on the tail end and a conical/spiked nosecone incorporating a louvered intake aperture with concentric rings on the leading end as an extension of the solid cone.

More specifically in accordance with the premise of the invention of a rocket or aerospace plane flying hypersonically through the atmosphere, FIG. 1 illustrates a simplistic aerospace plane 100 with an aerospike rocket engine 180 on the tail end and a conical/spiked nosecone 101 on the leading end. The nosecone incorporates a louvered intake aperture 102 with concentric rings on the (leading) end as an extension of the solid cone entraining incident/atmospheric air 105. FIG. 1 also illustrates adaptive aerospike keys 181 and 182, the aerospace plane body 190, a parafoil wing 191, a leading edge 192 and shroud/cowling 103. Cowling 103 may be construed as a cooling shroud as well as a salient regenerative nitrogen (ejector) heat exchanger 106. Functionally the incident ambient air 105 flows over nosecone 101 and enters spacecraft 100 via aperture 102. Normally nosecone 101 would act as an ablative shock cone. However with the advent of the art of supercooling and superconductivity, nosecone 101 will be morphed into a superconductive hypersonic liquefaction nosecone at hypersonic speed, usurping the incident shock front at formation whilst rendering (as a byproduct) a highly compressed/saturated air stream that will enter spacecraft 100 via the louvered aperture 102.

Figure 2:
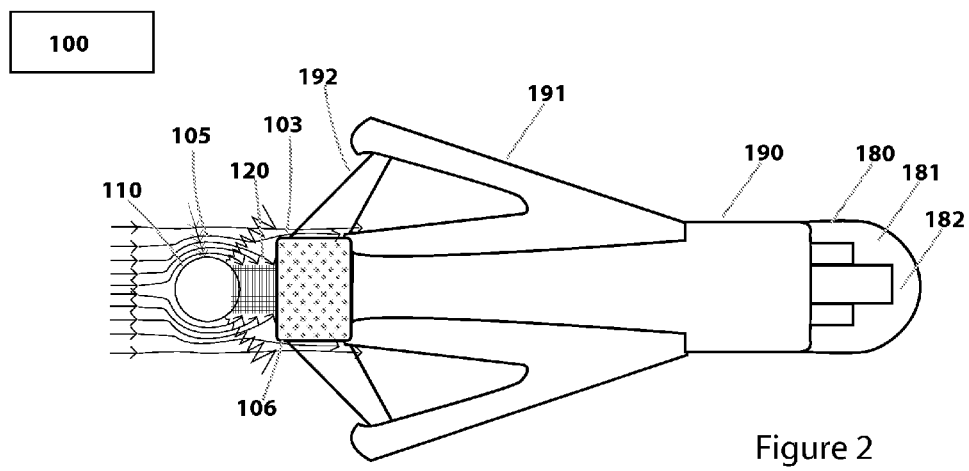
FIG. 2 illustrates an aerospace plane with an aerospike rocket engine on the tail end of a spherical nosecone incorporating a radial louvered intake aperture comprising concentric rings on the leading end.

FIG. 2 conversely illustrates another embodiment of the invention 100 whereby the nosecone 101 is configured as a spherical probe 110 and the louvered aperture 102 (from FIG. 1) as a finned cylinder 120. Functionally the incident ambient air 105 flows over spherical nosecone 110 (supra nosecone 101, FIG. 1) and enters spacecraft 100 via cylindrical aperture 120 (supra aperture 102, FIG. 1). Because of the extended surface area nosecone 110 will be superior to nosecone 101 due to enhanced ability to usurp the incident shock front at formation. Nosecone 110 also has a greater surface area and extended circumferential exposure with regards to the conical format of nosecone 101. More specifically the extended surface area of spherical nosecone 110 is an essential denominator with regards to the premise of optimality, eg limit dQ>>infinity, dL=0. Whereas dL constitutes the boundary layer, it is imperative to max the circumferential area to satisfy the condition of optimality to open the door to the Prandtl singularity, usurping the incident shock front and rendering cool/saturated (isothermally) compressed fluid stream entering aperture 120.

Figure 3:
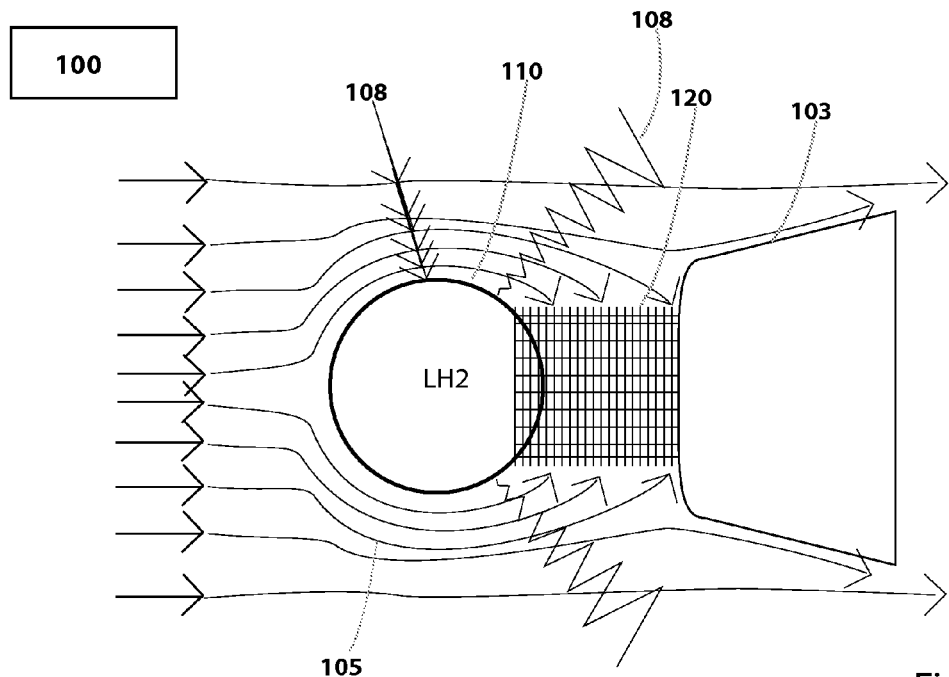
FIG. 3 illustrates an enlargement of the spherical nosecone (supercool/superconductive probe) and radial (incident air) intake louvers (regenerative liquefaction heat exchanger). It also illustrates shedding of ice emanating from ambient condensate.

FIG. 3 illustrates the parametric functioning of spherical nosecone 101 more specifically. More specifically the incident air is substantially compressed into a minute boundary layer. Compression of the boundary layer 108 is an imperative prerequisite in accordance with the premise of optimality (eg dL=0). Hence conforming cone 101 (FIG. 1) into sphere 110 (FIGS. 2/3) in maximizing the circumferential area. The same applies to maximizing the length of the fluid path (area of contact) that the incident air 105 must follow around sphere 110 prior to entering aperture 120. Max contact is a prerequisite for optimality. Sphere 110 offers maximum area of contact. Sphere 110 may however be dimpled, fluted, warped or finned to extend the contact area and to offer a drainage route for liquefacted oxygen. FIG. 3 also illustrates liquid hydrogen as the primary supercooling agent. Sphere 110 is conversely constructed out of copper that becomes superconductive at −420F/40R. Because of the superconductivity of sphere 110 and supercool expansion of liquid hydrogen (−423F/37R) the rate of heat transfer dQ would be infinitely high (a prerequisite for the condition of optimality of dQ>>infinity). Shedding of ice 108 would also be enhanced by the tangential inversion of the direction of flow of incident air 105 around sphere 110.

Figure 4:
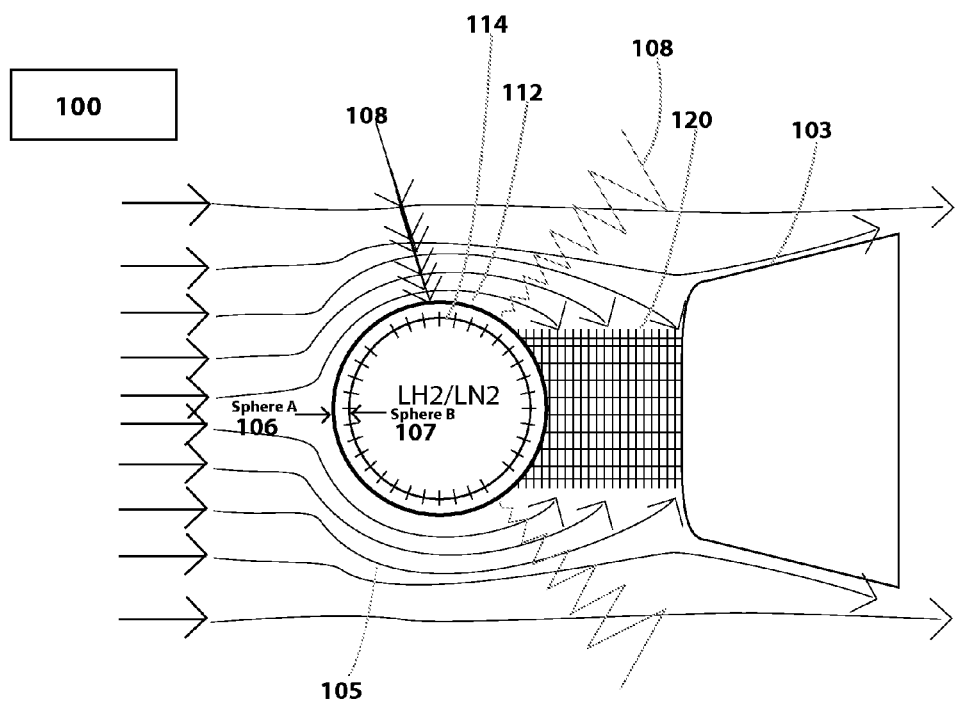
FIG. 4 illustrates the makeup of the double-decker, superemissive (or "scatter") blackbulb spherical nosecone in concert with the regenerative radial intake louvers. It also illustrates the relevance of liquid and liquefacted nitrogen as supercooling medium.

FIG. 4 illustrates the art of morphing copper sphere 110 (from FIG. 3) into a double-decker glass sphere 112 and (inner-concentric) copper sphere 114. Pointer 106 illustrates the close-contact prerequisite. Rationale for concentric spheres is three-fold, eg 1) isolating/insulating the supercool copper sphere 114 from the ambient environment 2) creating the ability to regulate the outer (glass) sphere 112 at an intermediate temperature and 3) to substitute liquefacted (regenerated) nitrogen as the principal supercooling medium by employing by means of a (finned) shell and tube inner sphere 114 in lieu of copper. The rationale (A) is simply (1) by virtue of an optically black etched/coated outer sphere 112 (2) maintaining the inner sphere 114 optically black and (3) radiation heat transfer driven by the 4th power of the absolute temperature, the rate of heat transfer would be infinitely high in event of an 100 C of 180 F temperature differential between the outer and inner spheres. The glass sphere would also become a passive component in the transfer process with external etching/coating of the external sphere. Rationale (B) is much more compelling inasmuch as substituting the inner (copper) sphere with a spherical finned coil bundle, liquefacted nitrogen may be employed as the principal supercooling medium as an optical black fin-coil bundle would for all practical purposes constitute a perfect black body obviating the need for a superconductive copper shell.

Figure 5:
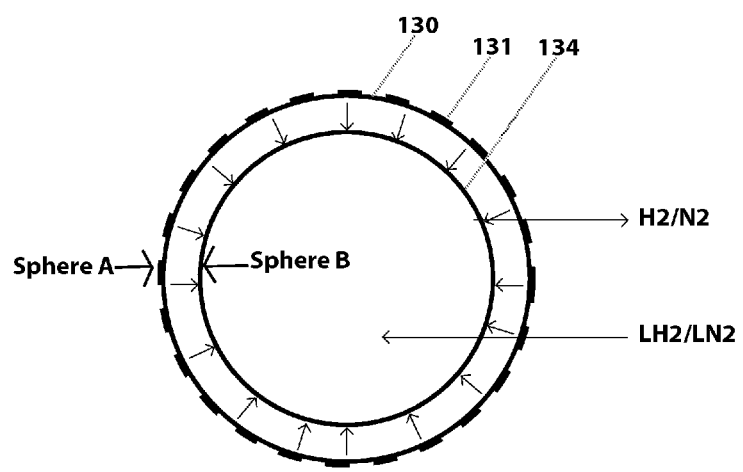
FIG. 5 illustrates the active components, like the optically black inner sphere or shell, and external etching or coating of the outer glass sphere or shell of the double-decker, superemissive blackbulb spherical nosecone.

FIG. 5 illustrates the "double-decker" (black bulb) synthesis more punctually via superemissive concentric spheres. More specifically heat is radiated from the (optically black) etching/coating 131 of the outer sphere 130 (through the glass shell) to the (optically black) etching/coating of the inner sphere 134. Superemissivity is driven via (imbedded) micro/nano prisms 136. The spheres are in close proximity to each other.

Radiation heat transfer is governed by the Boltzmann equation:

$$QR = A \times AZ \times EZ \times BZ \times (T2^4 - T1^4)$$

where A=area, AZ=form factor, EZ=emissivity and BZ=Boltzmann constant=$0.1714 \times 10-8$ Btu/hour/ft2/R4.

Normally both the form-factor (radiative contact) and the emissivity (optical contact) range from 0-1.0. In event of a tight fit=1.0. Same token EZ=1.0 for black bodies. In event T=460R (source) and T1=140R (sink) the rate of heat transfer QR becomes QR=$1 \times 1 \times 1 \times 0.1714 \times 10^{-8} \times 460^4$ (Btu/SF/h) =$0.1714 \times (10^{-8}) \times 447.8 \times 10^{8}$=77.9 Btu/SF/h (in the limit T1^4=0). At 600R (source) the rate of heat transfer QR=222.1 Btu/SF/h, at 800R (source) QR=702 Btu/SF/h and 1000R (source) (560 F) QR=1,714 Btu/SF/h. Since a dissipation rate of 310,356 Btu/SF/h is required so as to maintain isothermal compression in terms of the Prandtl singularity, the "superemissive" double-decker (superconductive) model will fail on the face. The solution to the superemissive-superconductivity quest hence vests with morphing of a "superemissive" form-factor. The solution is found in "scatter" emissivity via the etching or coating of micro/micron prisms imbedded on both the (active) source and sink surfaces. Given for example 10 micron prisms with a 45 deg cut-off and 50% spectral efficacy and 50% translucency, a multiplication factor of $(10^6/10) \times 0.5 \times 0.5 \times 0.5$=1,563 is being rendered. The respective "SUPEREMISSIVE" transfer rates hence become:

460R: QRR=$77.9 \times 1563$=121758 Btu/SF/h
600R: QRR=$222 \times 1563$=346,986 Btu/SF/h
800R: QRR=$702 \times 1563$=1,097,226 Btu/SF/h
1000R: QRR=$1714 \times 1563$=2,678,982 Btu/SF/h.

Mastering the art of scatter emissivity hence constitutes the key to morphing supercooling via constructive superemissivity. It is the key to opening the door to the Prandtl singularity and controlling the hypersphere rationally via isothermal compression and (regenerative) expansion of liquefacted nitrogen (and oxygen to a lesser extent) as principal supercooling agent(s).

Figure 6:
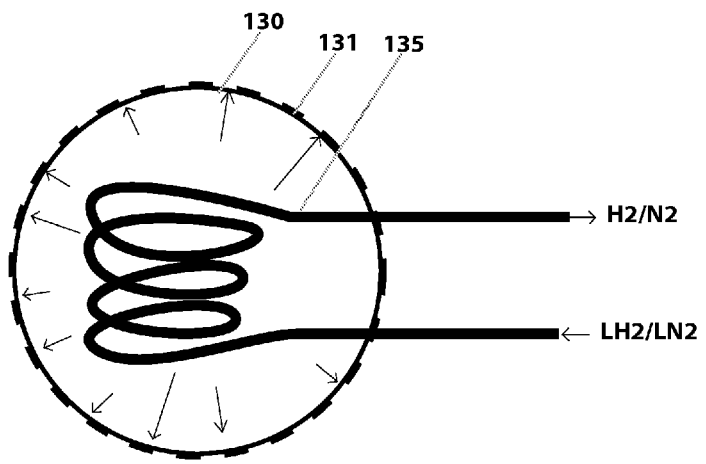
FIG. 6 illustrates an alternative finned tube (black bulb) approach as a substitute to the black bulb anchor with a solid inner shell.

FIG. 6 illustrates the art of morphing superconductivity via a superemissive concentric finned radiator 135 (in lieu of concentric spheres) driven by micro/nano prisms 136 in concert with sphere 130 and etching/coating 131 in accordance with the double-decker (black bulb) scatter synthesis. With the radiator approach superemissivity may be morphed because of the finned cavities may act as a perfect black bulb without special coatings. The liquefacted nitrogen and/or oxygen may be ducted in a tube array in lieu of filling a sphere in totality.

Persons skilled in the art will recognize that many modifications and variations are possible in the details, materials, and arrangements of the parts and actions which have been described and illustrated in order to explain the nature of this inventive concept and that such modifications and variations do not depart from the spirit and scope of the teachings and claims contained therein.

All patent and non-patent literature cited herein is hereby incorporated by references in its entirety for all purposes.

While the applicant understands that claims are not a necessary component of a provisional patent application and has not included detailed claims, the inventor reserves the right to claim, without limitation, the following subject matter.

I claim:

1. An aerospace plane flying hypersonically through the atmosphere comprising:
   a body;
   a nosecone on a leading end,
      said nosecone is a close-coupled, double-decker made of concentric spheres, optically black spherical heat exchanger with a superconductive outer shell and a supercooled inner shell, wherein the superconductive outer shell is etched or coated glass so that it is optically black; and,
      including an aperture for the intake of ambient air, a rocket engine on a tail end.

2. The aerospace plane of claim 1 wherein the nosecone is etched or coated with micro or nano prisms on the outer and inner surfaces.

3. The aerospace plane of claim 2 wherein the micro or nano prisms is diamond granules or diamond dust.

4. The aerospace plane of claim 1 further comprising a means to simultaneously usurp the shock front and distill a liquid chemical element from the ambient air.

5. The aerospace plane of claim 4 wherein the chemical element distilled from the ambient air is oxygen, nitrogen, or both.

6. The aerospace plane of claim 4 wherein said means are accomplished through either superconductivity or superemissivity to dissipate the heat of compression of the incipient shock wave at formation at an infinite rate, isothermally compress the incident air, and condense or cause the liquefaction of a portion of the incident air without employing mechanical means or the attribution of another medium.

7. The aerospace plane of claim 6 wherein the superconductivity or superemissivity is driven by the expansion of tanked liquid hydrogen, liquefacted oxygen, liquid methane or liquefacted nitrogen.

* * * * *